United States Patent
Lee et al.

(10) Patent No.: US 10,670,894 B2
(45) Date of Patent: Jun. 2, 2020

(54) CURVED DISPLAY DEVICE FOR VEHICLE AND MANUFACTURING METHOD THEREOF

(71) Applicant: HYUNDAI MOBIS CO., LTD., Seoul (KR)

(72) Inventors: Joung Hoon Lee, Yongin-si (KR); Hyun Jee Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/028,761

(22) Filed: Jul. 6, 2018

(65) Prior Publication Data

US 2019/0033651 A1 Jan. 31, 2019

(30) Foreign Application Priority Data

Jul. 28, 2017 (KR) ........................ 10-2017-0095946

(51) Int. Cl.
*G02F 1/1333* (2006.01)
*B60K 35/00* (2006.01)
*G02F 1/1362* (2006.01)
*G02F 1/1335* (2006.01)

(52) U.S. Cl.
CPC ........ *G02F 1/133305* (2013.01); *B60K 35/00* (2013.01); *G02F 1/133308* (2013.01); *G02F 1/136204* (2013.01); *B60K 2370/688* (2019.05); *B60K 2370/816* (2019.05); *B60K 2370/91* (2019.05); *G02F 1/133512* (2013.01); *G02F 2001/133325* (2013.01); *G02F 2001/133331* (2013.01); *G02F 2202/28* (2013.01)

(58) Field of Classification Search
CPC ......... G02F 1/136204; G02F 1/133305; G02F 1/133308; G02F 2001/133331; G02F 2202/28; G02F 1/133512; G02F 2001/133325; B60K 35/00; B60K 2370/688; B60K 2370/91; B60K 2370/816
See application file for complete search history.

(56) References Cited

U.S. PATENT DOCUMENTS

| | | | |
|---|---|---|---|
| 9,448,592 B2* | 9/2016 | Jin ....................... | H01L 51/5253 |
| 2002/0047952 A1* | 4/2002 | Kawata ................ | G04G 17/045 |
| | | | 349/58 |
| 2009/0183819 A1* | 7/2009 | Matsuhira ............... | B32B 37/12 |
| | | | 156/99 |
| 2016/0011021 A1* | 1/2016 | Masuda .................. | G01D 7/04 |
| | | | 116/288 |
| 2016/0202726 A1* | 7/2016 | Seen ................... | H04M 1/0268 |
| | | | 349/42 |
| 2016/0266279 A1* | 9/2016 | Aurongzeb ............ | G02B 1/111 |

* cited by examiner

*Primary Examiner* — Hoan C Nguyen
(74) *Attorney, Agent, or Firm* — Knobbe Martens Olson & Bear LLP

(57) ABSTRACT

The present invention relates to a curved display device for a vehicle and a manufacturing method thereof. In one embodiment, the curved display panel for the vehicle includes: a cover member which comprises a transparent window having a curved shape and a support cover formed on the lower side of the window, and which comprises a display region defined by an opening formed in the support cover, and a non-display region excluding the display region; and a panel assembly bonded to a lower side of the support cover.

8 Claims, 6 Drawing Sheets

CURVED DISPLAY DEVICE FOR VEHICLE AND MANUFACTURING METHOD THEREOF

CROSS-REFERENCE TO RELATED APPLICATION(S)

This application claims the benefit of Korean Patent Application No. 10-2017-0095946, filed on Jul. 28, 2017 in the Korean Intellectual Property Office, the entire disclosure of which is incorporated herein by reference.

BACKGROUND OF THE INVENTION

Field of the Invention

The present invention relates to a curved display device for a vehicle and a manufacturing method thereof.

Description of the Related Art

Display devices for vehicles provide visual information such as images to the user, and have become thinner in thickness so that the range of application thereof can widen. In recent years, curved displays have been developed which not only function as output devices that merely provide information, but also have left and right ends that protrude forward and a center that protrudes backward. The curved displays have been introduced to the market as high-grade products with increased screen immersion and visibility.

The display device may include: a panel that displays image information by electrical signals; a bezel that surrounds the panel; and a backlight that irradiates light to the panel to enable image information to be displayed from the panel. In this display device, a transparent cover member is formed on the panel in order to protect the panel. In this regard, an adhesive may be applied to the upper surface to attach the cover member to the panel. In addition, in order to prevent the adhesive from flowing out of the panel when the adhesive is applied between the panel and the cover member, a process of separately forming a dam structure along the rim of the cover member is performed.

In order to remove bubbles generated between the panel and the adhesive, an autoclave process is additionally performed to remove the bubbles. The autoclave process is performed under high-temperature and high-pressure conditions, and thus has the disadvantage of increasing process time and costs. In addition, there is a problem in that the bubbles are not completely removed even after the autoclave process, and thus increase the defective rate of the product.

Prior art documents related to the present invention include Korean Patent No. 10-1748234 (published on Jun. 16, 2017; entitled "Method for etching curved liquid crystal display panel without junction failure and curved liquid crystal display panel manufactured thereby".

SUMMARY OF THE INVENTION

One aspect of the present invention is directed to a curved display device for a vehicle. The curved display device for the vehicle includes: a cover member which includes a transparent window having a curved shape and a support cover formed on the lower side of the window, and which includes a display region defined by an opening formed in the support cover, and a non-display region excluding the display region; and a panel assembly bonded under the support cover, wherein the support cover includes a first region formed along the periphery of the opening, and a second region formed at the periphery of the first region and stepped higher than the first region; an adhesive layer is formed between the panel assembly and a window region corresponding to the display region; the panel assembly is bonded along the interface between the first region and the second region in such a manner that the display panel of the panel assembly comes in contact with the adhesive layer; and at least one through-hole for discharging bubbles generated between the adhesive layer and the panel assembly is formed at the interface between the first region and the second region.

In one embodiment, the panel assembly may include: a display panel disposed under the adhesive layer and configured to display images on the display region; a fixing bracket disposed under the display panel and configured to fix the display panel; a printed circuit board (PCB) disposed under the fixing bracket; and a back cover receiving the display panel, the fixing bracket and the PCB and coupled to the support cover.

In one embodiment, the display panel may be an LCD panel.

In one embodiment, the window and the support cover may be manufactured by double injection molding of different thermoplastic resins.

In one embodiment, the adhesive layer is formed by applying and curing an optical adhesive composition between a window region corresponding to the display region and the first region. The optical adhesive composition may include one or more of an optical clear adhesive (OCA) composition and an optical clear resin (OCR) composition.

In one embodiment, the curved display device may further include an auxiliary coating layer formed on the upper surface of the window. The auxiliary coating layer may be an anti-finger coating layer, an anti-glare coating layer or an anti-reflective coating layer.

In one embodiment, the support cover may have a light-shielding property.

Another aspect of the present invention is directed to a method for manufacturing the curved display device for the vehicle. In one embodiment, method for manufacturing the curved display device for the vehicle includes: preparing a cover member which includes a transparent window having a curved shape, and a light-shielding support cover formed on the lower side of the window, and which includes a display region defined by an opening formed in the support cover, and a non-display region excluding the display region; applying an optical adhesive composition to the lower side of the window corresponding to the display region; and bringing the optical adhesive composition into contact with one surface of a panel assembly, wherein the support cover includes a first region formed along the periphery of the opening, and a second region formed at the periphery of the first region and stepped higher than the first region; the panel assembly is bonded along the interface between the first region and the second region in such a manner that the display panel of the panel assembly comes in contact with the adhesive layer; and at least one through-hole for discharging bubbles generated between the adhesive layer and the panel assembly is formed at the interface between the first region and the second region.

The vehicle's curved display device according to the present invention makes it possible to simplify processes, and may show excellent productivity and economic efficiency, and have a low defective rate and a high degree of design freedom.

DETAILED DESCRIPTION OF THE INVENTION

Figure 1:
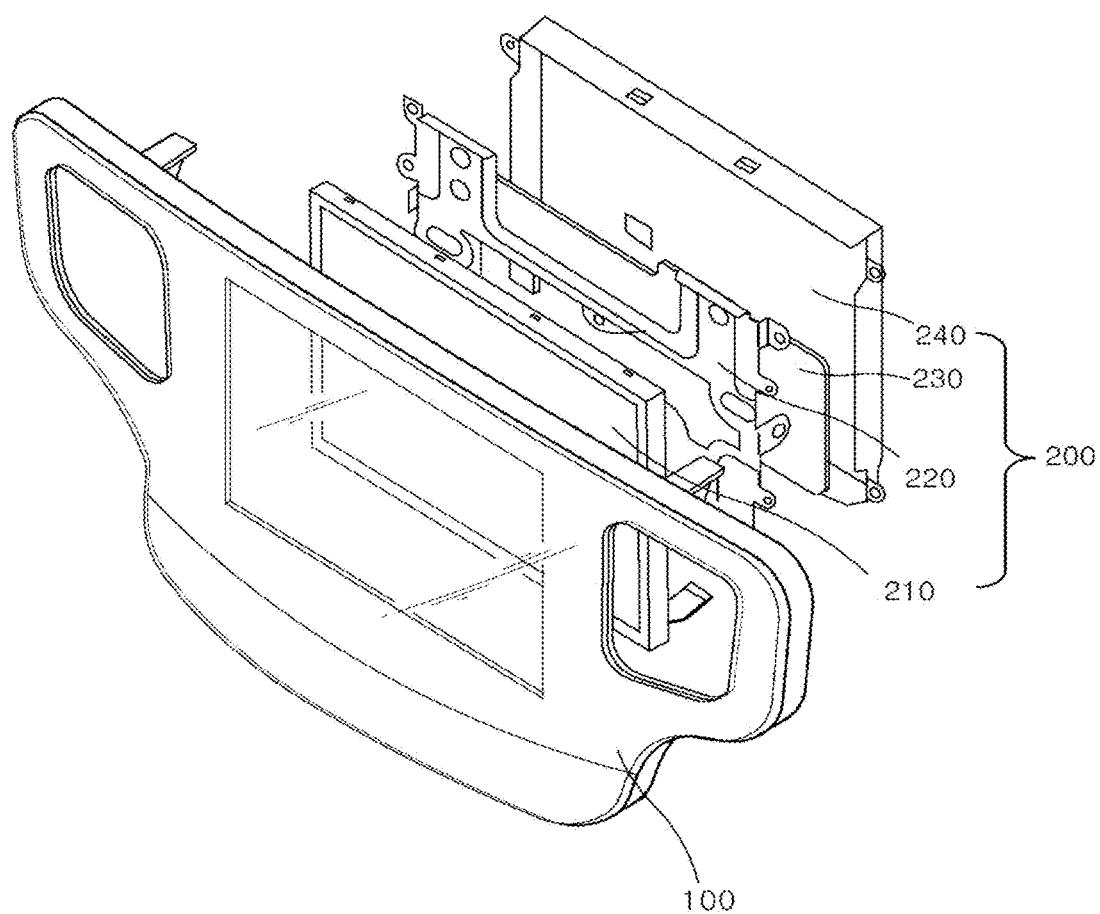
FIG. 1 shows a curved display device for a vehicle according to one embodiment of the present invention.

Hereinafter, exemplary embodiments of the present invention will be described in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The drawings are not necessarily to scale and in some instances, proportions may have been exaggerated in order to clearly illustrate features of the embodiments. Furthermore, although only a portion of a constituent element is also shown for convenience of explanation, any person skilled in the art will easily recognize the remaining portion of the element. Generally, the description of the drawings is made from the observer's viewpoint. When one element is referred to as being "on" or "under" another element, it not only refers to a case where the element is formed directly located "on" or "under" the other element but also a case where an additional element exists between these elements. Furthermore, any person skilled in the art will appreciate that the present invention may be embodied in various different forms without departing the technical spirit of the present invention. Throughout the drawings, the same reference numerals are used to designate substantially the same elements.

In the following description, the detailed description of related known technology will be omitted when it may obscure the subject matter of the present invention.

In addition, the terms of constituent elements, which will be described hereinafter, are defined in consideration of their functions in the present invention and may be changed according to the intention of a user or an operator, or according to the custom. Accordingly, definitions of these terms must be based on the overall description herein.

As used herein, the term "transparent" means transparency with a visible light transmittance of at least 80%.

Curved Display Device for Vehicle

Figure 2A:
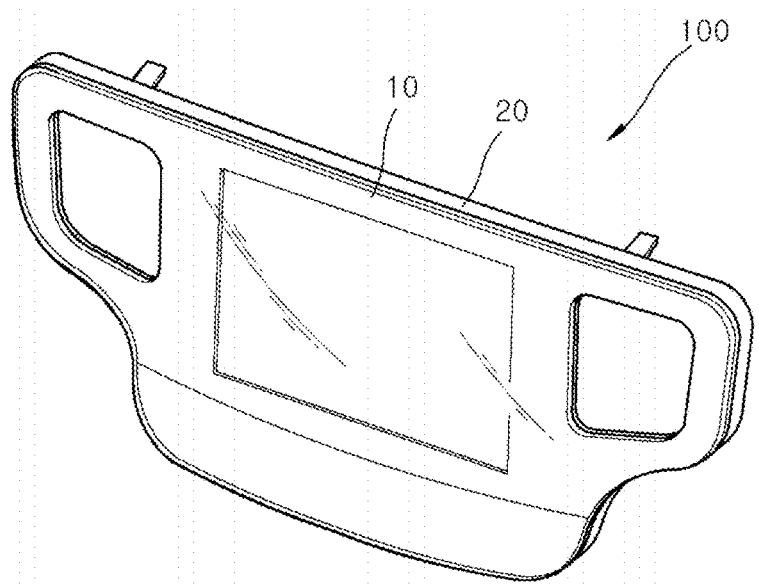
FIG. 2(a) shows a front view of a cover member in a curved display device for a vehicle according to one embodiment of the present invention.
Figure 2B:
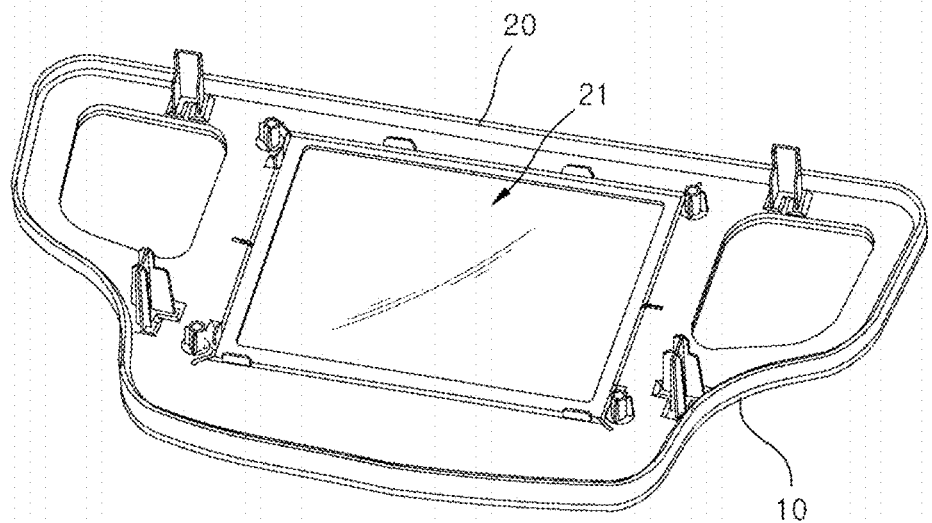
FIG. 2(b) shows a rear view of the cover member.
Figure 3:
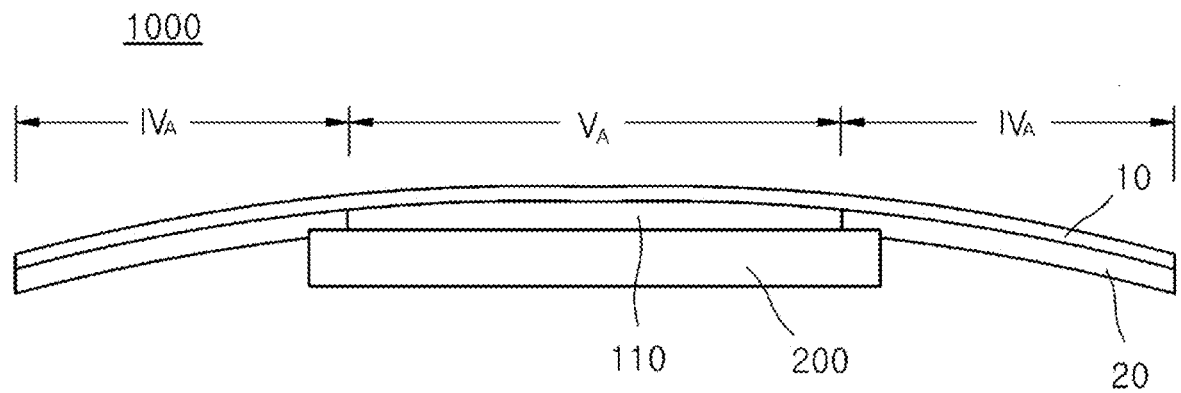
FIG. 3 shows a cross-section of a curved display device for a vehicle according to one embodiment of the present invention.
Figure 4:
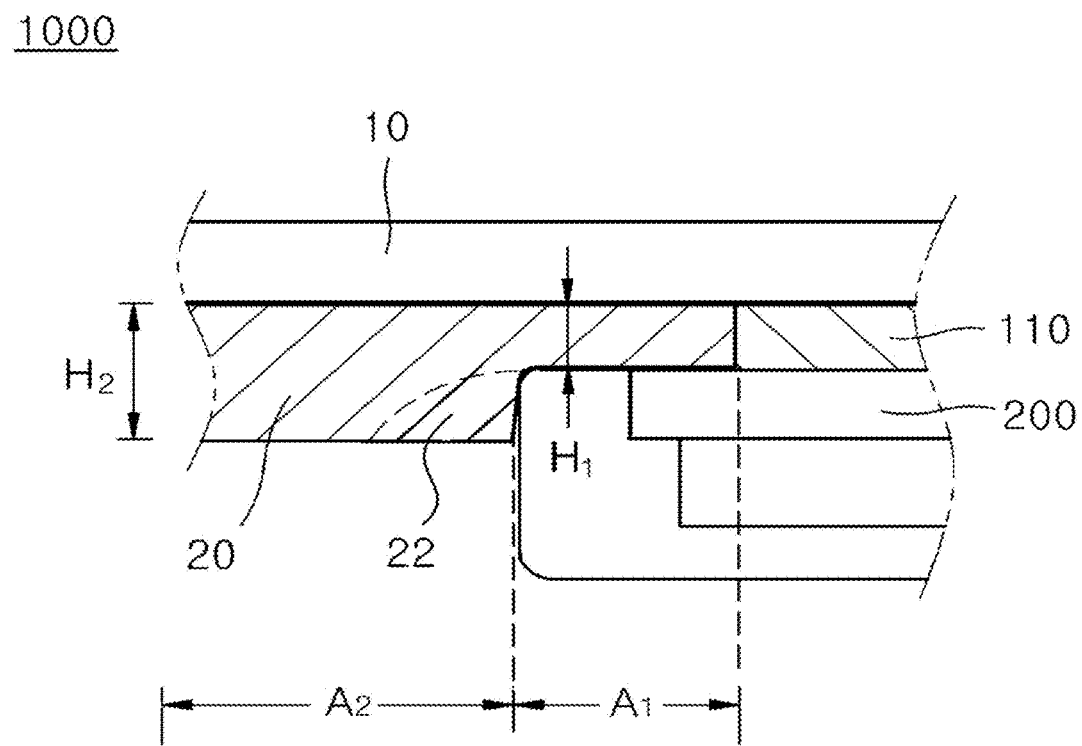
FIG. 4 shows a cross-section of a curved display device for a vehicle according to one embodiment of the present invention.

One aspect of the present invention is directed to a curved display device for a vehicle. FIG. 1 shows a curved display device for a vehicle according to one embodiment of the present invention. FIG. 2(a) shows a front view of a cover member 100 in a curved display device for a vehicle according to one embodiment of the present invention, and FIG. 2(b) shows a rear view of the cover member 100. In addition, FIG. 3 shows a cross-section of a curved display device for a vehicle according to one embodiment of the present invention, and FIG. 4 shows an enlarged cross-section of a curved display device for a vehicle according to one embodiment of the present invention.

Referring to FIGS. 1 to 4, a curved display device 1000 for a vehicle includes: a cover member 100, which includes a transparent window 10 having a curved shape and a support cover 20 formed on the lower side of the window 10, and which includes a display region $V_A$ defined by an opening 21 formed in the support cover 20, and a non-display region $IV_A$ excluding the display region; and a panel assembly 200 bonded under the support cover 20.

The support cover 20 includes a first region $A_1$ formed along the periphery of the opening, and a second region $A_2$ formed at the periphery of the first region $A_1$ and stepped higher than the first region $A_1$. Between a window region corresponding to the display region $V_A$ and the panel assembly 200, an adhesive layer 110 is formed. The panel assembly 200 is bonded along the interface between the first region $A_1$ and the second region $A_2$ in such a manner that the display panel of the panel assembly 200 comes into contact with the adhesive layer 110.

In one embodiment, through injection molding, the first region $A_1$ may be formed along the periphery of the opening of the support cover 20, and the second region $A_2$ may be formed at the periphery of the first region $A_1$ so as to be stepped higher than the first region $A_1$. Referring to FIG. 4, the height $H_2$ of the second region of the support cover 20 is higher than the height $H_1$ of the first region. When this stepped structure is formed, it is possible to prevent an optical adhesive composition (to be described below) from flowing to regions other than the display region upon application of the composition, and it is possible to omit a conventional process of forming a dam structure by applying a highly viscous thermoplastic resin composition to the support cover to prevent leakage of an adhesive composition. Thus, the stepped structure has the effect of simplifying processes and may increase process efficiency and productivity.

In one embodiment, on the bottom surface of the window 10 corresponding to the display region $V_A$, the adhesive layer 110 is formed. In one embodiment, the thickness of the adhesive layer 110 formed may be equal to or higher than the height $H_1$ of the first region. For example, the thickness of the adhesive layer formed may be equal to the height $H_1$ of the first region.

Figure 5:
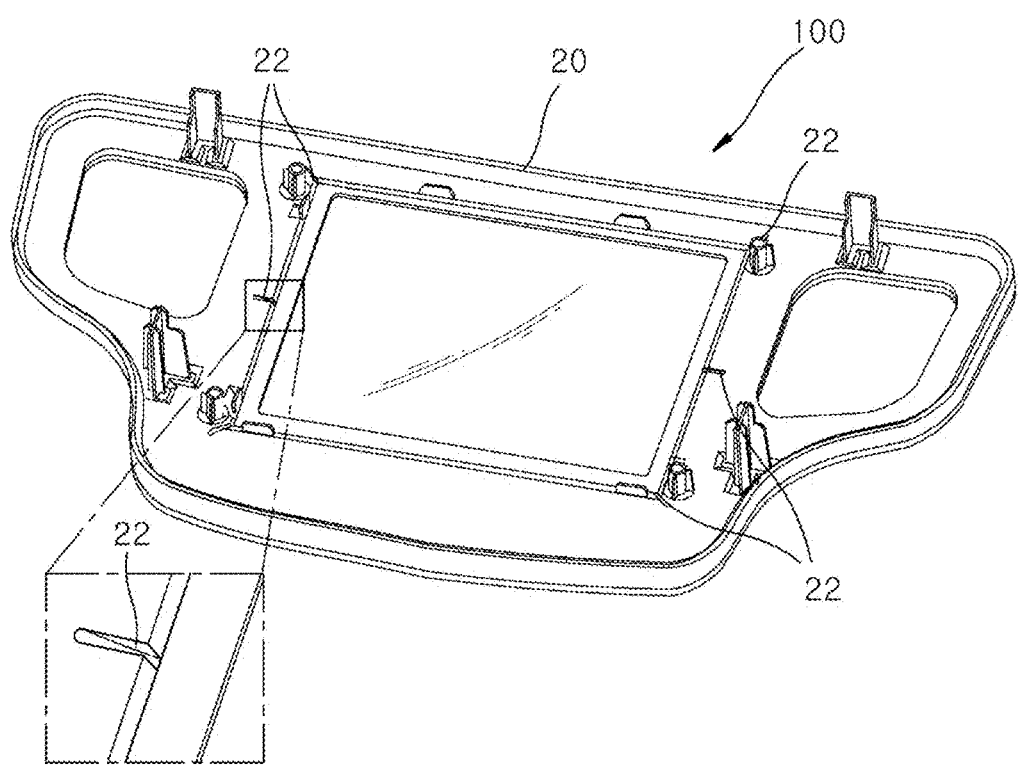
FIG. 5 shows a rear view of a curved display device for a vehicle according to one embodiment of the present invention.

FIG. 5 shows a rear view of a cover member in a curved display device according to one embodiment of the present invention. Referring to FIG. 5, at least one through-hole 22 for discharging bubbles generated between the adhesive layer and the panel assembly is formed at the interface between the first region $A_1$ and the second region $A_2$ of the support cover 20. For example, as shown in FIG. 5, the through-hole 22 may be formed at each of the corners of the interface between the first region $A_1$ and the second region $A_2$ and the centers of the left and right portions of the interface.

Referring to FIG. 1, the panel assembly 200 may include: a display panel 210 coming in contact with the bottom surface of the adhesive layer and configured to display images on the display region; a fixing bracket 220 disposed under the display panel 210 and configured to fix the display panel 210; a printed circuit board (PCB) 230 disposed under the fixing bracket 220; and a back cover 240 coupled to the support cover 20 of the cover member 100 and configured to receive the display panel 210, the fixing bracket 220 and the PCB 230.

In one embodiment, the display panel 210 may be an LCD panel.

In one embodiment, the window 10 and support cover 20 of the cover member 100 may be formed by double injection molding from different thermoplastic resins. For example, the cover member 100 may be manufactured by double injection molding using first and second thermoplastic resins for forming the window 10 and the support cover 20.

In one embodiment, the window 10 may be formed using a transparent first thermoplastic resin composition. For example, the first thermoplastic resin composition may include olefin resin, epoxy resin, acrylic resin, urethane resin, silicone resin, polyester resin and the like, but is not limited thereto.

In one embodiment, the support cover 20 may have a light-shielding property. In one embodiment, the support cover 20 may be formed using a light-shielding second thermoplastic composition. The support cover 20 may be formed using a second thermoplastic resin composition including a black pigment. In this case, the non-display region $IV_A$ may be formed by light shielding of a region excluding the display region $V_A$, and a conventional printing process for light shielding of the non-display region may be omitted. Thus, the effect of simplifying processes may be obtained, and process efficiency and productivity may be increased.

Referring to FIG. 4, the adhesive layer 110 may be formed by applying and curing an optical adhesive composition between a window region corresponding to the display region and the first region $A_1$. The optical adhesive composition may include one or more of an optical clear adhesive (OCA) composition and an optical clear resin (OCR) composition. When the adhesive layer 110 is formed by the above-described method, the panel assembly 200 may be easily bonded, and the display panel 210 may come in contact with the adhesive layer 110, so that it may have excellent display visibility.

In one embodiment, the curved display device for the vehicle may further include an auxiliary coating layer formed on the upper surface of the window. The auxiliary coating layer may be an anti-finger coating layer, an anti-glare coating layer or an anti-reflective coating layer.

Method for Manufacturing Cover Member for Curved Display Device for Vehicle

Figure 6:
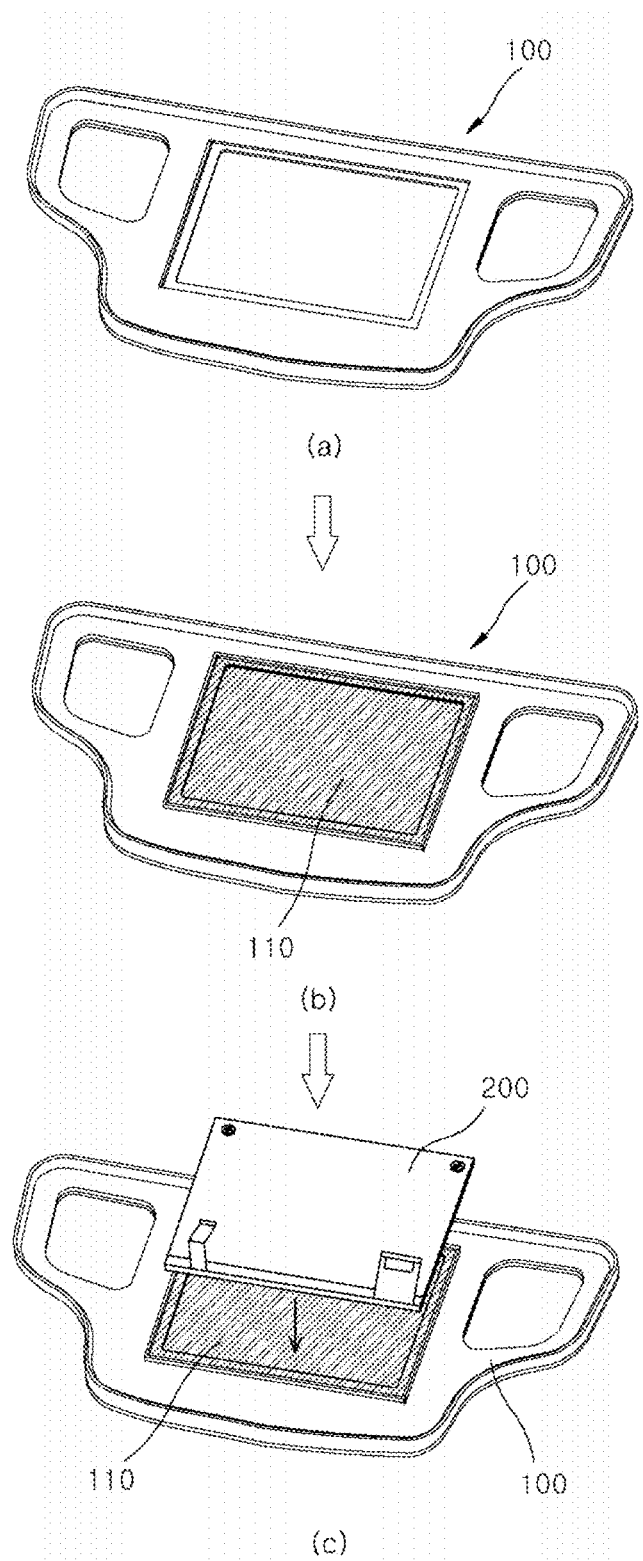
FIG. 6 shows a method for manufacturing a cover member for a curved display device for a vehicle according to one embodiment of the present invention.

Another aspect of the present invention is directed to a method for manufacturing a cover member for a curved display device for a vehicle. FIG. 6 shows a method for manufacturing a cover member for a curved display device for a vehicle according to one embodiment of the present invention. Referring to FIG. 6, the method for manufacturing the cover member for the curved display device for the vehicle includes: (a) preparing a cover member which includes a transparent window having a curved shape, and a light-shielding support cover formed on the lower side of the window, and which includes a display region defined by an opening formed in the support cover, and a non-display region excluding the display region; (b) applying an optical adhesive composition to the lower surface of the window corresponding to the display region; and (c) bringing the optical adhesive composition into contact with one surface of a panel assembly.

The support cover includes a first region formed along the periphery of the opening, and a second region formed at the periphery and stepped higher than the first region. The panel assembly is bonded along the interface between the first region and the second region in such a manner that the display panel of the panel assembly comes in contact with the adhesive layer. At the interface between the first region and the second region, at least one through-hole for discharging bubbles generated between the adhesive layer and the panel assembly is formed.

Figure 7A:
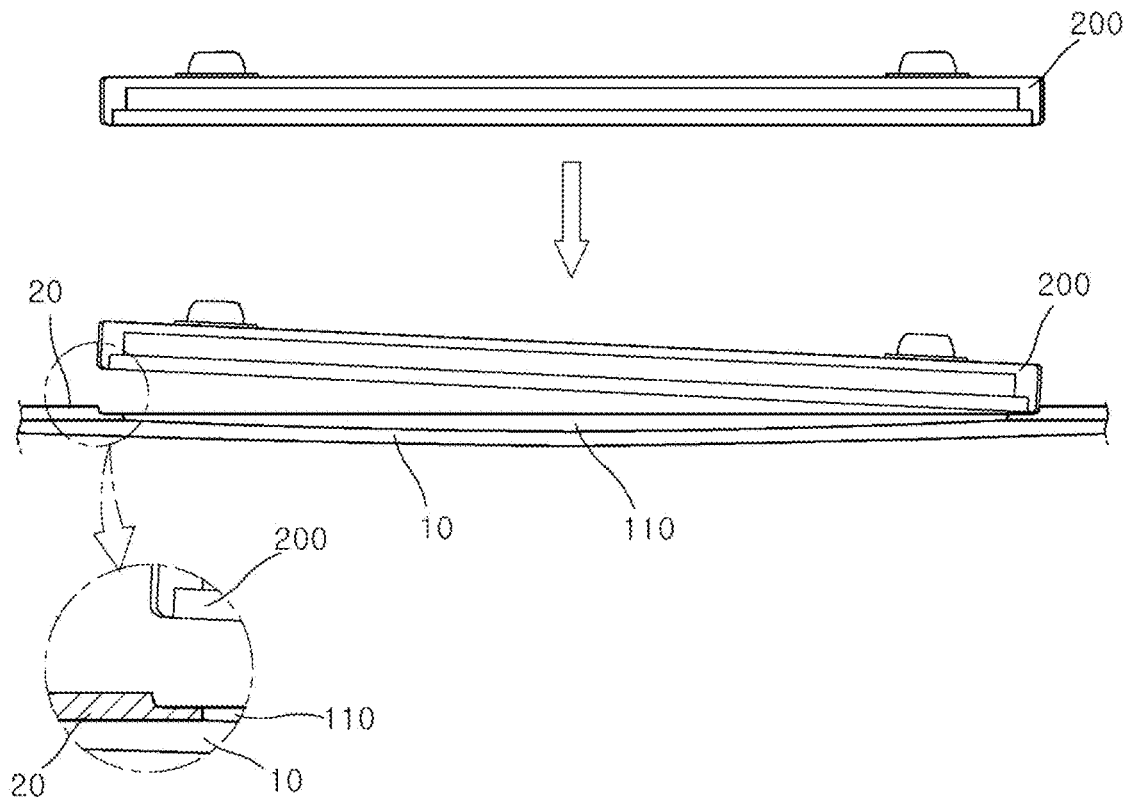
FIG. 7(a) shows a process of bonding a panel assembly to the cover member of the present invention.
Figure 7B:
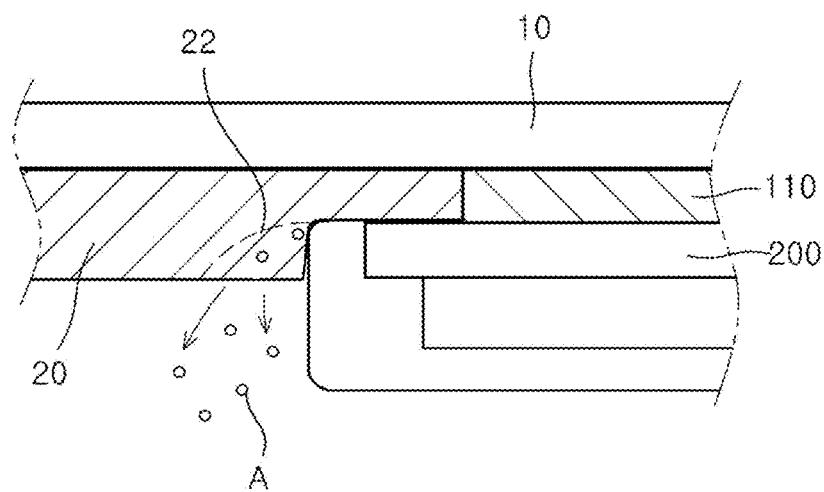
FIG. 7(b) shows that bubbles, generated between an adhesive layer and a panel assembly when the panel assembly is bonded to the cover member, are discharged to the outside.

FIG. 7(a) shows a process of bonding the panel assembly to the cover member, and FIG. 7(b) shows that bubbles A, generated between the adhesive 110 and the panel assembly 200 when the panel assembly is bonded to the cover member, are discharged to the outside.

Referring to FIG. 7, the adhesive layer 110 may be formed by bringing the applied optical adhesive composition into contact with the panel assembly and curing the optical adhesive composition. At this time, as shown in FIG. 7(b), bubbles generated between the adhesive 110 and the panel assembly 200 may be discharged to the outside through the through-hole 22 formed at the interface between the first region and second region of the support cover 20.

The optical adhesive composition may include one or more of an optical clear adhesive (OCA) composition and an optical clear resin (OCR) composition. For example, the adhesive layer 110 may be formed using an optical clear resin composition.

In one embodiment, an auxiliary coating layer may further be formed on the upper surface of the window 10 of the curved display device for the vehicle. The auxiliary coating layer may be an anti-finger coating layer, an anti-glare coating layer or an anti-reflective coating layer.

The curved display device for vehicle according to the present invention makes it possible to simplify processes, and shows excellent productivity and economic efficiency. Furthermore, it can prevent the generation of bubbles between the adhesive layer and the display panel even when a window having a curved shape is applied, and thus the defective rate of the product can be reduced. In addition, it may have excellent visibility and a high degree of design freedom.

Hereinafter, preferred examples of the present invention will be described in further detail. It is to be understood, however, that these examples are for illustrative purposes only and are not intended to limit the scope of the present invention in any way.

EXAMPLES AND COMPARATIVE EXAMPLE

Example

Double injection molding from a transparent first thermoplastic resin and a light-shielding second thermoplastic resin was performed, thereby preparing a cover member 100 which includes a transparent window 10 having a curved shape and a light-shielding support cover 20 formed on the lower side of the window, and which includes a display region $V_A$ defined by an opening 21 formed in the support cover 20, and a non-display region $IV_A$ excluding the display region.

At this time, as shown in FIG. 4, the support cover 20 formed included a first region $A_1$ formed along the periphery of the opening of the support cover, and a second region $A_2$ formed at the periphery of the first region and stepped higher than the first region. In addition, as shown in FIG. 5, a through-hole 22 was formed at each of the four corners of the interface between the first region and the second region and the centers of the left and right portions of the interface.

In addition, a panel assembly 200 was prepared which includes: a display panel 210 configured to display images on the display region; a fixing bracket 220 disposed under the display panel 210 and configured to fix the display panel 210; a printed circuit board (PCB) 230 disposed under the fixing bracket 220; and a back cover 240 receiving the display panel 210, the fixing bracket 220 and the PCB 230 and coupled to the support cover 20.

Next, as shown in FIG. 6(b), an optical adhesive resin (OCR) composition was applied to the lower side of the window 10 corresponding to the display region $V_A$ in such a manner that the thickness thereof was equal to the height $H_1$ of the first region. In addition, the panel assembly 200 was bonded along the interface between the first region and the second region in such a manner that the optical adhesive resin composition came into contact with one side of the panel assembly as shown in FIG. 6(c), thereby manufacturing a curved display device 100 for a vehicle. At this time, bubbles A generated between the adhesive layer 110 and the panel assembly 200 were discharged through the through-hole 22 formed at the interface between the first region and the second region.

Comparative Example 1

A curved display panel for a vehicle was manufactured in the same manner as described in the Example, except that the through-hole 22 for discharging bubbles was not formed.

In the Example and Comparative Example 1, 1000 vehicle's curved display devices were manufactured. During this manufacturing process, whether bubbles would be generated in the display region was observed. When the bubbles were generated in a curved defective device, the curved display device was judged as defective. The defective rate was measured, and the results are shown in Table 1 below.

TABLE 1

|  | Example | Comparative Example 1 |
| --- | --- | --- |
| Defective rate (%) | 4.0 | 18.0 |

From the results in Table 1 above, it could be seen that the defective rate in the Example, in which the through-hole configured to discharge bubbles was formed, was significantly lower than that in Comparative Example 1 in which the through-hole was not formed.

Comparative Example 2

A curved display device for a vehicle was manufactured in the same manner as described in the Example, except that the adhesive layer 110 was not formed and the window 10 of the display region $V_A$ was spaced apart from the display panel 200.

The transmittances of the curved display devices manufactured in the Example and Comparative Example 2 were measured according to a conventional method, and the results of the measurement are shown in Table 2 below.

TABLE 2

|  | Example | Comparative Example 2 |
| --- | --- | --- |
| Transmittance (%) | 93.0 | 88.0 |

From the results in Table 2 above, it could be seen that the curved display device of the Example of the present invention, in which the adhesive layer was formed in contact with the display panel, had excellent visibility compared to that of Comparative Example 2 in which the adhesive layer was not formed and the window and the display panel were formed to be spaced apart from each other.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A curved display device for a vehicle, comprising:
   a display panel assembly;
   a display cover attached to the display panel assembly and covering the display panel assembly, the display cover comprising a transparent window having a curved shape and a support cover disposed over and attached to the transparent window, the support cover comprising a display hole configured to expose the display panel assembly therethrough; and
   an adhesive layer disposed in the display hole and interconnecting the display panel assembly and the transparent window,
   wherein the support cover comprises a front surface facing the transparent window, a rear surface facing away from the front surface and a peripheral surface surrounding the display hole and connecting the front surface and the rear surface,
   wherein the support cover comprises a recessed portion that is recessed from the rear surface for receiving the display panel assembly, wherein the recessed portion comprises a bottom surface located around the display hole and facing away from the front surface, wherein the recessed portion further comprises a side surface connecting the bottom surface and the rear surface,
   wherein the support cover comprises a plurality of discharging holes, each of which is formed between the side surface and the rear surface for discharging bubbles between the adhesive layer and the display panel assembly.

2. The curved display device of claim 1, wherein the display panel assembly comprises:
   a display panel disposed attached to the adhesive layer
   a fixing bracket coupled to the display panel;
   a printed circuit board (PCB) coupled to the fixing bracket; and
   a back cover configured to receive the display panel, the fixing bracket and the PCB, wherein the back cover comprises an edge portion received in the recessed portion.

3. The curved display device of claim 2, wherein the display panel is an LCD panel.

4. The curved display device of claim 1, wherein the transparent window and the support cover are formed of different thermoplastic resins.

5. The curved display device of claim 1, wherein the adhesive layer is formed of an optical adhesive composition, wherein the optical adhesive composition comprises one or more of an optical clear adhesive (OCA) composition and an optical clear resin (OCR) composition.

6. The curved display device of claim 1, further comprising an auxiliary coating layer formed over an upper surface of the transparent window,
wherein the auxiliary coating layer comprises an anti-finger coating layer, an anti-glare coating layer or an anti-reflective coating layer.

7. The curved display device of claim 1, wherein the support cover has a light-shielding property.

8. A method for manufacturing a curved display device for a vehicle, the method comprising:
providing a display panel assembly;
providing a display cover comprising a transparent window having a curved shape and a support cover disposed over and attached to the transparent window, the support cover comprising a display hole, wherein the support cover comprising a front surface facing the transparent window, a rear surface facing away from the front surface and a peripheral surface surrounding the display hole and connecting the front surface and the rear surface, wherein the support cover comprises a recessed portion that is recessed from the rear surface for receiving the display panel assembly, wherein the recessed portion comprises a bottom surface located around the display hole and facing away from the front surface, wherein the recessed portion further comprises a side surface connecting the bottom surface and the rear surface, wherein the support cover comprises a plurality of discharging holes, each of which is formed between the side surface of the recessed portion in a direction away from the recessed portion;
applying an optical adhesive composition to a surface of the transparent window in the display hole; and
bringing the display panel assembly into contact with the optical adhesive composition such that the optical adhesive composition is the transparent window and the display panel assembly,
curing the optical adhesive composition to form an adhesive layer interconnecting the transparent window and the display panel assembly, wherein bubbles between the adhesive layer and displace panel assembly are discharged through the plurality of discharging holes.

* * * * *